United States Patent [19]

Nami et al.

[11] Patent Number: 5,327,202
[45] Date of Patent: Jul. 5, 1994

[54] ELASTIC BODY OF AN ADDITION REACTION TYPE SILICONE RUBBER ELASTIC MATERIAL USED IN ELASTIC ROLLER AND FIXING DEVICE

[75] Inventors: Yasuo Nami, Kawasaki; Takeshi Menjo, Tokyo; Kazuo Kishino; Hideo Kawamoto, both of Kawasaki, all of Japan

[73] Assignee: Canon Kabushiki Kaisha, Tokyo, Japan

[21] Appl. No.: 922,514

[22] Filed: Jul. 31, 1992

[30] Foreign Application Priority Data

Aug. 1, 1991 [JP] Japan .................. 3-193176
Aug. 6, 1991 [JP] Japan .................. 3-219333
Sep. 20, 1991 [JP] Japan .................. 3-268965

[51] Int. Cl.$^5$ ............................... G03G 15/20
[52] U.S. Cl. ................... 355/282; 355/285; 428/447; 430/124
[58] Field of Search ............ 355/282, 285, 289, 290, 355/295; 428/446, 447, 145; 430/124; 523/213

[56] References Cited

U.S. PATENT DOCUMENTS

| Re. 33,289 | 8/1990 | Modic | 428/145 |
|---|---|---|---|
| 4,830,893 | 5/1989 | Nakamura et al. | 428/35.8 |
| 4,970,559 | 11/1990 | Miyabayashi | 355/290 |
| 5,013,772 | 5/1991 | Fujiki et al. | 523/213 |
| 5,099,285 | 3/1992 | Hirano et al. | 355/245 |
| 5,120,609 | 6/1992 | Blaszak et al. | 428/446 |
| 5,157,445 | 10/1992 | Shoji et al. | 355/284 |
| 5,162,858 | 11/1992 | Shoji et al. | 355/299 |
| 5,166,031 | 11/1992 | Bodesha et al. | 430/124 |
| 5,177,552 | 1/1993 | Isogai et al. | 355/285 |
| 5,190,827 | 2/1993 | Lin | 428/447 |

FOREIGN PATENT DOCUMENTS

| 0336633 | 10/1989 | European Pat. Off. . |
|---|---|---|
| 0349072 | 1/1990 | European Pat. Off. . |
| 2040386 | 2/1971 | Fed. Rep. of Germany . |
| 54-26373 | 9/1979 | Japan . |
| 54-41330 | 12/1979 | Japan . |
| 54-41332 | 12/1979 | Japan . |
| 57-46068 | 10/1982 | Japan . |
| 61-144675 | 7/1986 | Japan . |
| 3-33786 | 2/1991 | Japan . |

*Primary Examiner*—Fred L. Braun
*Attorney, Agent, or Firm*—Fitzpatrick, Cella, Harper & Scinto

[57] ABSTRACT

The invention is for an elastic body formed by addition reaction type silicone rubber elastic material. The material is obtained by curing a polysiloxane mixture including at least (a) straight-chain dimethyl polysiloxane having the viscosity of 8000 poise or more at a temperature of 25° C. and terminated with vinyl groups; and (b) resinous organopolysiloxane having at least two vinyl groups and having the viscosity of 10–1000 poise at the temperature of 25° C. and a resin segment with at least one of a 4-functional constitutional unit and a 3-functional constitutional unit, and an oil segment with a 2-functional constitutional unit. The elastic body is used in forming an elastic roller and fixing device using an elastic roller.

66 Claims, 3 Drawing Sheets

ELASTIC BODY OF AN ADDITION REACTION TYPE SILICONE RUBBER ELASTIC MATERIAL USED IN ELASTIC ROLLER AND FIXING DEVICE

BACKGROUND OF THE INVENTION

1. Field of the Invention

The present invention relates to an elastic body made of elastic material such as addition reaction type silicone rubber, and more particularly, it relates to an elastic body used for forming rollers such as fixing rollers, feed rollers and the like or blades such as cleaning blades, developing blades and the like, which must have the good mold-releasing ability and are used with an image forming system such as an electrophotographic copying machine, electrophotographic printer and the like.

Further, the present invention relates to an elastic roller using such elastic body, and a fixing device having such elastic roller.

2. Related Background Art

Generally, feed rollers having a pair of elastic rollers, for feeding a sheet-like transfer material or a recording sheet such as a plain paper sheet, OHP film and the like (which is used with an image forming system such as an electrophotographic copying machine, electrophotographic printer and the like) along a predetermined path are required to have the good feeding ability, mold-releasing ability and durability.

The blade such as a cleaning blade for removing toner and/or dirt remaining on a photosensitive member used with the image forming system, a developing blade for forming a thin toner layer on a developing sleeve and the like is functionally disposed in sliding contact with the toner and thus is required to have the good mold-releasing ability and high wear resistance and therefore high durability.

The feed rollers used with the image forming system and having a pair of elastic rollers for feeding a recording sheet on which a non-fixed toner image was formed must have the good mold-releasing ability, high wear resistance and high durability, since they must pressurize the toner image on the recording sheet and, if necessary, heat the toner image to fix onto the recording sheet, and feed the recording sheet along a predetermined path while preventing the offset phenomenon.

Heretofore, a fixing roller is comprised of a metallic core, and a coating layer disposed around the core and made of good mold-releasing material such as fluororesin or silicone rubber. In the image forming system, the fixing roller having the silicone rubber coating layer which is inferior to the fixing roller having the fluororesin coating layer in the mold-releasing ability and durability but superior to the latter in the provision of the good image quality tends to be used in view of the importance of the image quality, and thus the improvement of the mold-releasing ability and durability of the silicone rubber material has been investigated and developed.

In color electrophotography, in order to reproduce an image color as close to an original image color as possible, since a plurality of color toners are heat-fused and mixed, it is necessary to use the toners having a low softening point. When the toner having the low softening point is used, if the toner image is thermally fixed by a fixing roller having the fluororesin (for example, Teflon) coating layer which has been used with a general copying machine for obtaining a black and white image, the offset phenomenon that the toner is adhered to the fixing roller will be generated noticeably, thus making the formation of the good fixed image difficult extremely. To avoid such offset phenomenon, it has been tried to always apply silicone oil (as toner separating agent) to a surface of a fixing roller having an outer coating layer made of silicone rubber material with the good mold-releasing ability and special grade.

However, the mold-releasing ability of the existing silicone rubber materials is still insufficient, and, therefore, the improvement of the mold-releasing ability and durability of the silicone rubber material has been investigated and developed.

For example, the Japanese Patent Appln. Laid-Open No. 61-144675 teaches the fact that, in the addition reaction type silicone rubber materials, hardened matter comprised of straight-chain dimethyl polysiloxane terminated with vinyl groups having molecular weight of 20000-200000 has the good mold-releasing ability.

According to the above Japanese gazette, it is said that as the molecular weight of the straight-chain dimethyl polysiloxane terminated with vinyl groups is greater, the mold-releasing ability get higher. However, if the molecular weight exceeds 200000, the physical strength of the matter will be doubtful, and thus such matter cannot be used practically.

Now, the relation between the molecular weight and the viscosity of the straight-chain dimethyl polysiloxane will be briefly described. In general, when the molecular weight of the dimethyl polysiloxane is increased, the viscosity is also increased; in case of the straight-chain dimethyl polysiloxane, the molecular weight of 200000 corresponds to the viscosity of about 60000 poise.

On the other hand, in the conventional coating layers of the roller, when the rollers having the mold-releasing agent applied thereto are used as the fixing rollers under the heated condition at high temperature, the mold-releasing agent enters into the outer layers of the rollers, thus deteriorating the silicone rubber constituting the outer layers. Such deterioration is particularly noticeable in the outer layer of the higher temperature roller.

To avoid such deterioration of the outer layers, the Japanese Patent Publication No. 54-41330 proposes providing an intermediate layer as an oil barrier layer made of fluororubber and the like between the silicone rubber layers as the outer layer of each roller. Further, as disclosed in the Japanese Patent Publication Nos. 54-41332 and 57-46068, it has been proposed that an underlayer was formed by mixing the base material with non-swelling material (i.e., material hard to be swollen). However, when the deterioration of the silicone rubber layer is prevented with the above-mentioned method, it is necessary to select materials having excellent mold-releasing ability as the outer layer material of the roller, with the result that at least two layers are required to constitute the outer layer of the roller.

Alternatively, Japanese Patent Publication No. 54-26373 teaches the fact that silicone rubber constituting the rubber layer used as the outer layer of the roller and silicone oil applied thereto are selected so as not to cause the swelling of the rubber layer, and the selected silicone rubber and silicone oil are combined. However, according to this Japanese gazette, it is said that the combination of addition silicone rubber and phenylmethyl silicone oil is not preferable because of the occurrence of the swelling.

Further, the Japanese Patent Appln. Laid-Open No. 3-33786 discloses a heat fixing roller comprising a metallic core member, an elastic layer made of silicone rubber, an oil barrier layer made of fluororubber, and a mold-releasing layer made of addition silicone rubber, where such layers are arranged around the core. With the arrangement of this heat fixing roller, the mold-releasing agent is prevented from penetrating into the elastic rubber layer by the oil barrier fluororubber layer, and the toner separating ability, lipophilic ability to the silicone oil, surface smoothness and wear resistance are provided on the roller surface by the mold-releasing agent or surface lubricant.

However, the mold-releasing layer formed on the surface of the heat fixing roller disclosed in this Japanese Patent Appln. Laid-Open No. 3-33786 is formed by curing the mixture comprised of 100 weight part of methylvinyl polysiloxane ((a) component) having at least two vinyl groups per molecule and a polymerization degree of 5000–12000, and 1–100 weight part of methylvinyl polysiloxane ((b) component) containing triorganosilhemioxane unit (M unit) and silicate unit (Q unit) in a specific rate. More particularly, in an embodiment, since it is said-that the heat fixing roller having the mold-releasing layer formed by combining 100 weight part of the (a) component and 30 weight part of the (b) component containing the M unit and Q unit has the durable offset life for 30000 sheets, it is considered that the methylvinyl polysiloxane constituting the (b) component is polymer having resin segment comprising the M unit and Q unit as a main component. Accordingly, the methylvinyl polysiloxane constituting the (b) component in this embodiment has a resin segment comprising the M unit and Q unit as the main component, and a soft segment comprising continuous diorganosiloxane unit (D unit) has only a short, hard resin skeletal structure wherein the number of repeating units is several tenths at the most. The mold-releasing layer formed by curing the mixture of the (b) component methylvinyl polysiloxane and the (a) component methylvinyl polysiloxane limits the service life of the roller, since the mold-releasing ability of the (b) component is insufficient. Further, if the mixing rate of the (b) component is increased, the elastic body obtained by heat curing the mixture will become harder and fragile.

SUMMARY OF THE INVENTION

An object of the present invention is to provide an elastic body, elastic roller and fixing device which can eliminate the above-mentioned conventional drawbacks.

More particularly, an object of the present invention is to provide an elastic body which has the good mold-releasing ability and physical strength.

Another object of the present invention is to provide an elastic roller and a fixing device having such an elastic roller, which have the good anti-offset ability, can fix a non-fixed toner image onto a recording sheet effectively and do not deteriorate the fixed image.

A further object of the present invention is to provide an elastic roller and fixing device which have the good anti-offset ability and the durability and can fix a toner image onto a recording sheet stably.

A still further object of the present invention is to provide an elastic body comprising addition reaction type silicone rubber elastic material obtained by curing a polysiloxane mixture including at least ( a ) straight-chain dimethyl polysiloxane terminated with vinyl groups having the viscosity of 80000 poise or more at a temperature of 25° C. and (b) resinous organopolysiloxane having at least two vinyl groups and having the viscosity of 10–1000 poise at the temperature of 25° C. and comprising a resin segment comprising at least one of a 4-functional constitutional unit and a 3-functional constitutional unit, and an oil segment comprising a 2-functional group.

A further object of the present invention is to provide an elastic roller for fixing a non-fixed toner image carried on a recording sheet onto the recording sheet, comprising a core member and an elastic layer formed on a surface of the core member and made of addition reaction type silicone rubber elastic material which is obtained by curing a polysiloxane mixture including at least (a) straight-chain dimethyl polysiloxane terminated with vinyl groups having the viscosity of 80000 poise or more at a temperature of 25° C. and (b) resinous organopolysiloxane having at least two vinyl groups and having the viscosity 10–1000 poise at the temperature of 25° C. and comprising a resin segment comprising at least one of a 4-functional constitutional unit and a 3-functional constitutional unit, and an oil segment comprising a 2-functional group.

The other object of the present invention is to provide a fixing device for fixing non-fixed toner images carried on a recording sheet onto the recording sheet by heating and pressurizing the toner image, comprising a fixing means adapted to pinch, heat and pressurize the recording sheet on which the non-fixed toner image is carried and including a pair of rotatable fixing members which are urged against each other and at least one of which has a heating means therein, and wherein the fixing member contacting with the non-fixed toner image comprises a core member and an elastic layer formed on a surface of the core member and made of addition reaction type silicone rubber elastic material which is obtained by curing a polysiloxane mixture including at least (a) straight-chain dimethyl polysiloxane terminated with vinyl groups having the viscosity of 80000 poise or more at a temperature of 25° C. and (b) resinous organopolysiloxane having at least two vinyl groups and having the viscosity of 10–1000 poise at the temperature of 25° C. and comprising a resin segment comprising at least one of a 4-functional constitutional unit and a 3-functional constitutional unit, and an oil segment comprising a 2-functional constitutional unit.

DESCRIPTION OF THE PREFERRED EMBODIMENTS

Figure 1:
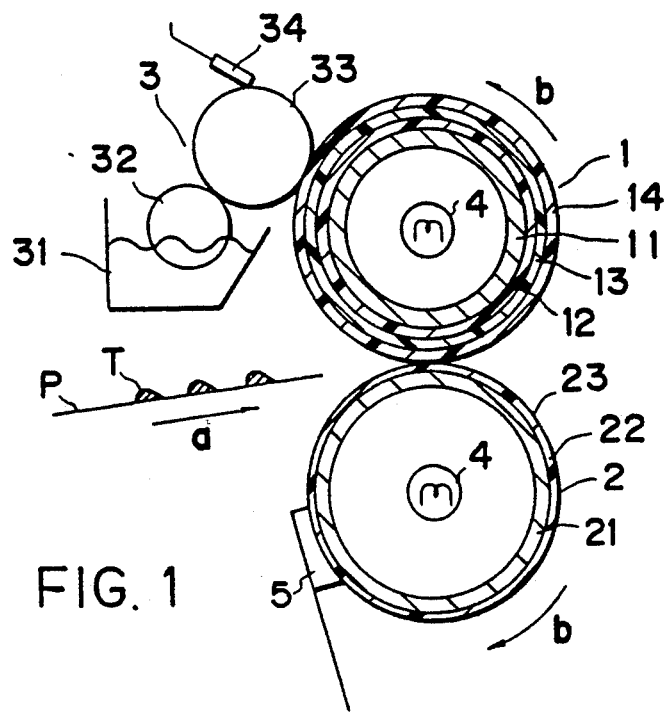
FIG. 1 is schematic elevational sectional view of a heat fixing device wherein an elastic body according to the present invention is used as a fixing roller.

The inventors have zealously investigated and have realized that, in the addition reaction type silicone rubber elastic bodies, the known straight-chain dimethyl polysiloxane terminated with vinyl groups having the viscosity of 80000 poise or more (corresponding to molecular weight of 210000 or more) which has the improved mold-releasing ability but which has not been used practically due to the lack of physical strength can be put in practical use, by combining it with resinous organopolysiloxane having the viscosity of 10-1000 poise at the temperature of 25° C. and comprising a resin segment comprising at least one of a 4-functional constitutional unit and a 3-functional constitutional unit, and an oil segment comprising a 2-functional group and having at least two vinyl groups.

Further, it was found that the effect of the improved mold-releasing ability of the straight-chain dimethyl polysiloxane terminated with vinyl groups having the viscosity of 80000 poise or more is better than that found in the past, with the result that it is possible to provide addition reaction type silicone rubber elastic body having the good balance between the high mold-releasing ability and the physical strength.

According to the investigation conducted by the inventors, it was found that, when the special addition reaction type silicone rubber obtained by curing the polysiloxane mixture including at least straight-chain dimethyl polysiloxane terminated with vinyl groups having the viscosity of 80000 poise or more and resinous organopolysiloxane with vinyl groups comprising block polymer having a resin segment including 4-functional constitutional unit and/or 3-functional constitutional unit and an oil segment including 2-functional group in the same molecule was used as the addition reaction type silicone rubber and phenylmethyl silicone oil was combined with such addition reaction type silicone rubber, it was possible to prevent or suppress the swelling of the rubber, and thus such special addition reaction type silicone rubber was preferable as material for an outer layer of a roller.

Accordingly, when outer elastic layers of a fixing roller and of a pressure roller (these rollers constitute a pair of rollers of a fixing device) are formed from the elastic body according to the present invention, it is possible to suppress the swelling of the outer layer due to the silicone oil as mold-releasing agent applied to at least one of the fixing roller and pressure roller, with the result that there is no need to provide any barrier layer made of fluororesin on the rollers.

The addition reaction type silicone rubber elastic body according to the present invention can be obtained by curing the mixture containing the following components.

Component (1)

Straight-chain dimethyl polysiloxane having the viscosity of 80000 poise at a temperature of 25° C. terminated at its both ends with constitutional units of $((CH_2=CH)(CH_3)_2SiO_{1/2})$ and comprising constitutional units having a general formula of $(CH_3)_2SiO$ (2-functional).

Component (2)

Resinous polysiloxane which is a block polymer having a viscosity of 10-1000 poise at the temperature of 25° C. and including a resin segment comprising the constitutional unit having the general formula of $SiO_2$ (4-functional) or $CH_3SiO_{3/2}$ (3-functional) and an oil segment having 100 or more continuous constitutional units having a general formula of $(CH_3)SiO$ (2-functional) in the same molecule, and includes constitutional units of $(CH_2=CH)(CH_3)_2SiO_{1/2}$, $(CH_2=CH)(CH_3)_2SiO$ or $(CH_2=CH)SiO_{3/2}$ with two or more vinyl groups in each molecule.

According to the present invention, the oil segment in the component (2) preferably comprises the straight-chain segment having at least 100 or more (preferably, 300 or more) continuous constitutional units indicated by the general formula of $(CH_3)SiO$ (2-functional).

Component (3)

Hydrogen polysiloxane having one or more silicon-linked hydrogen atom per molecule (in average) (preferably, having the viscosity of 1-100 centipoise at the temperature of 25° C.).

Component (4)

Platinum-type catalyst.

The elastic body according to the present invention is obtained by curing the uniform mixture having the above components (1)–(4) as basic components. The curing mechanism is similar to the curing mechanism for the so-called addition reaction type silicone rubber, wherein the linked polysiloxane forms a network structure by the addition reaction between the silicon-linked vinyl groups in the components (1), (2) and the silicon-linked hydrogen atoms in the component (3) under the existence of the platinum-type catalyst of the component (4), thereby forming the rubber elastic body.

The component (1) greatly contributes to the mold-releasing ability. Although it is already known that the straight-chain dimethyl polysiloxane contributes to improvement in the mold-releasing ability, the effect of the straight-chain dimethyl polysiloxane having the viscosity of 80000 poise or more remarkably exceeds that conventionally expected on the basis of the low viscous materials.

The dimethyl polysiloxane terminated at its both ends with the vinyl end groups, which has been conventionally used as a main component for LTV materials, has the viscosity of 5-1000 at the most. Although it is known that materials corresponding to the component (1) have partly been used as HTV material, they have not been used as LTV material because of the higher viscosity. The viscosity of the component (1) at the temperature of 25° C. is required to have the value of 80000 poise or more, and is preferably 100,000–1,000,000 poise. The rate of the component (1) in the mixture is preferably 10% by weight or more and less than 50% by weight, and more preferably is 20-49% by weight. If less than 10% by weight, the effect of the component (1) will be insufficient, while, if 50% by weight or more, the workability of the product will be worsened.

The component (2) is a component contributing to reduce the viscosity of the component (1) and increase the physical strength. In order to increase the physical strength of the silicone rubber, it is known to use compound hydrated synthetic silicic acid or synthetic silicic anhydride as reinforcing agent. However, with the hydrated synthetic silicic acid, unless the greater amount of silicic acid is added to the dimethyl silicone rubber (for example, 20-50 parts by weight based on 100 parts by weight of dimethyl silicone rubber), the reinforcing effect is not obtained and the mold-releasing ability is greatly reduced. With the synthetic silicic anhydride, although the reinforcing effect can be obtained by the addition of the smaller amount (for example, 10–20 parts by weight) than that of the hydrated synthetic silicic acid, the mold-releasing ability is also reduced greatly. Therefore, heretofore, there was no elastic body having the good balance between the mold-releasing ability and the physical strength.

The component (2) has the resin segment and the oil segment and essentially has the reinforcing ability. And, it provides the product having the very good balance between the mold-releasing ability and the physical strength due to the entanglement between the molecules in the components (1) and (2).

In particular, silicone resin including the so-called ladder polymer consisting of constitutional unit $CH_3SiO_{3/2}$, or silicone resin comprising the so-called block polymer having the resin segment and the oil segment in the same molecule are suitable to reinforce the component (1). The viscosity of the component (2) at the temperature of 25° C. is preferably 10–1000 poise, and more preferably is 20–500 poise.

The compounding amount of the component (2) is preferably about 50–90% by weight in the mixture, and more preferably is 51–70% by weight. If less than 50% by weight, the reinforcing ability will be insufficient, while, if more than 90% by weight, the mold-releasing ability is decreased. The ratio between the compounding amounts of the components (1) and (2) is preferably 100:101–900, and more preferably is 100:101–350.

The component (3) is curing agent. Since, if the remaining amount of reactive groups which do not contribute to the reaction is great after the curing has been finished, the mold-releasing ability is worsened, the molar ratio of the silicon-linked hydrogen atoms to the total vinyl groups in the mixture is preferably adjusted within a range of 0.6–2.5, and more preferably 1.0–2.0.

The platinum group catalyst of the component (4) is catalyst effective to aid the reaction between the vinyl groups and the silicon-linked hydrogen atoms. The amount of the catalyst to be added is properly determined on the basis of the workability and the like.

In the present invention, the viscosity of the polysiloxane including the above-mentioned components (1) to (4) is preferably 500–20000 poise, and more preferably is 1000–10000 poise.

As well as the above-mentioned basic components, it is preferable to include proper amounts of straight-chain dimethyl polysiloxane of low molecule terminated with vinyl groups and containing side chain vinyl.

Further, other reinforcing agents may be added, or coloring agent, heat-resistance improving agent and/or thixotropy agent may be added, without affecting a bad influence upon the objects of the present invention.

The elastic body according to the present invention is applicable to members such as a fixing roller, developing blade or cleaning blade, which must have the elasticity.

Next, devices to which the elastic body of the present invention can be applied will be explained.

FIG. 1 is a schematic elevational sectional view of a heat fixing device wherein the elastic body of the present invention is used as a fixing roller of this device.

The fixing device includes a fixing roller 1 and a pressure roller 2 which are disposed at a fixing station. An oil applying means 3 is provided to apply silicone oil as mold-releasing agent for separating toner to a surface of the fixing roller 1.

The fixing roller 1 comprises a core member 11 made of aluminium, an elastic core layer 12 formed on the core member and having HTV silicone rubber, a fluororubber layer 13 formed on the elastic core layer 12 as an oil barrier layer and having a thickness of 50 μm, and an elastic layer 14 formed on the fluororubber layer 13 and comprising LTV (liquid rubber) silicone rubber and having the offset preventing ability and having a thickness of 400 μm. An outer diameter of the fixing roller 1 is selected to have a value of 40 mm, for example.

The pressure roller 2 comprises a core member 21 made of aluminium, an elastic core layer 22 having HTV silicone rubber, and a fluororesin layer 23 formed on the elastic core layer 22 as an oil barrier. An outer diameter of the pressure roller 2 is selected to have a value of 40 mm, for example.

Within the core members 1, 21 of the fixing roller 1 and of the pressure roller 2, halogen heaters 4 are disposed acting as heating bodies, and a thermistor 5 associated with the pressure roller 2 detects the temperature of the pressure roller 2 to ON/OFF control the halogen heater 4, so that the temperatures of the fixing roller 1 and the pressure roller 2 are maintained to a constant value, for example, 170° C. The fixing roller 1 and the pressure roller 2 are rotatingly driven in directions shown by the arrows b by means of a driving device (not shown), with the result that the recording sheet P fed in a direction shown by the arrow a by means of a feeding device (not shown) is pinched by the fixing roller and the pressure roller and is passed therebetween, meanwhile the non-fixed toner image on the recording sheet P is fixed onto the recording sheet P by heat and pressure from both rollers. The oil applying means 3 comprises upper and lower supply rollers 32, 33 which pick up offset-preventing mold-releasing agent such as dimethyl silicone oil or fluorosilicone oil contained in a container 31 to apply the mold-releasing agent to the elastic layer 14 of the fixing roller 1. The applying amount of the silicone oil is adjusted by an abutment angle and pressure of an oil amount adjusting blade 34 abutted against the upper supply roller 33. Cleaners may be associated with the fixing roller 1 and the pressure roller 2 to remove the toner adhered onto these rollers.

Figure 2:
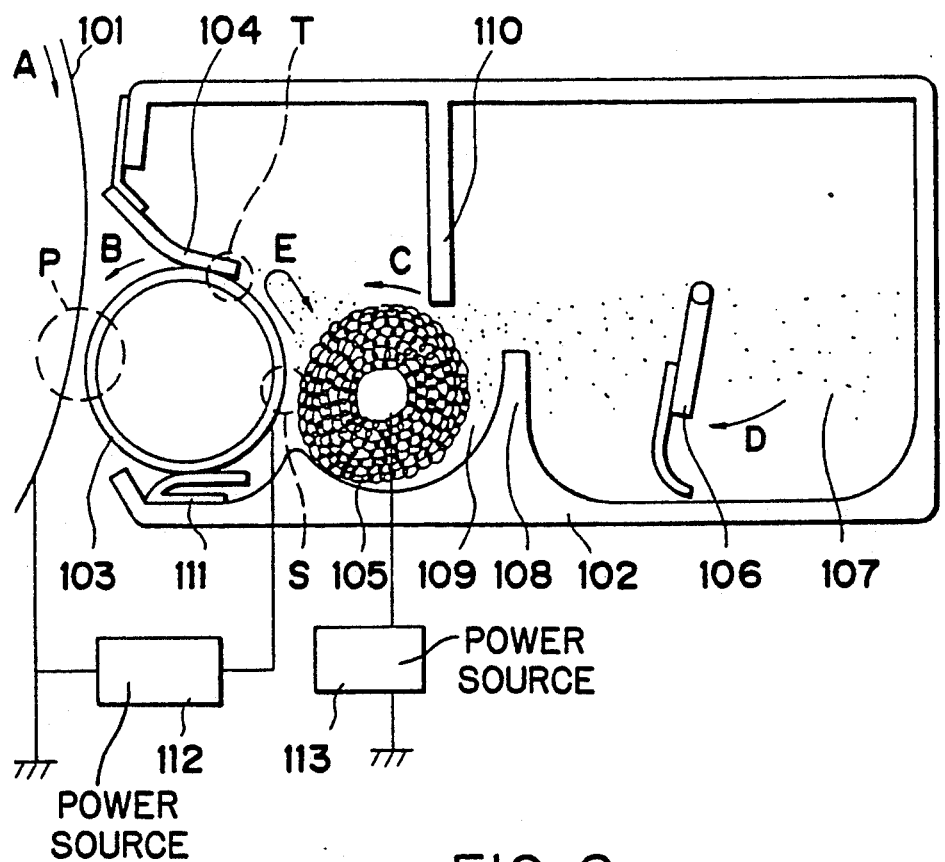
FIG. 2 is a schematic elevational sectional view of a developing device and therearound, wherein an elastic body according to the present invention is used as a developing blade.

FIG. 2 is a schematic elevational view of a developing device and therearound, wherein the elastic body of the present invention is used as a developing blade.

In FIG. 2, the reference numeral 101 denotes a photosensitive drum acting as an electrostatic latent image bearing member rotated in a direction shown by the arrow A. The photosensitive drum 101 is constituted by a conductive core member and an organic photometric layer made of photosensitive body, and an electrostatic latent image is formed on the photosensitive drum by an electrostatic recording means (not shown).

The developing device is disposed in confronting relation to the photosensitive drum 101. The developing device comprises a developer supply container (referred to merely as "container" hereinafter) 102, a developing sleeve 103 as a developer bearing member, an elastic blade 104 serving as a developer regulating means and formed by an elastic body of the present invention, a supply roller 105 as a developer supplying and separating means, and a toner feed member 106 as a developer feeding means.

The container 102 is provided with an aperture extending in a longitudinal direction of the developing device (perpendicular to a plane of FIG. 2) within which the developing sleeve 103 is arranged. The developing sleeve 103 is made of non-magnetic material such as aluminium or stainless steel. The developing sleeve 103 is rotatably supported and rotatingly driven in a direction shown by the arrow B by a drive source (not shown). The developing sleeve 103 is provided at its surface with ridges and recesses at a pitch of 0.5–5 μm to hold toner positively.

Behind the developing sleeve 103, there is arranged the supply roller 105 so that it is rotated while contacting with the developing sleeve at a sliding contact area S. The supply roller 105 is rotated in the same direction as the developing sleeve 103 to supply the developer to the developing sleeve 103 and to remove the toner which is held by the developing sleeve and which has not been used for the developing operation by elastic contact with the developing sleeve 103.

At a downstream side of the sliding contact area S between the supply roller 105 and the developing sleeve 103 in a rotating direction of the developing sleeve 103, there is disposed the elastic blade 104 in such a manner that a free end of the elastic blade is urged against the developing sleeve 103 at an abutment area T where the passage of the developer on the developing sleeve 103 is regulated.

The abutment area T is positioned toward the supply roller 105 with respect to the vertical plane passing through a center of the developing sleeve 103 and above the supply roller 105, and the sliding contact area S and the abutment area T have a relative positional relation that the toner removed at the abutment area T can be dropped onto the supply roller 105. Thus, the smooth toner circulating flow is formed in a space between the abutment area T and the sliding contact area S.

The toner feed member 106 rotated in a direction shown by the arrow D is disposed within the container 102 arranged behind the supply roller 105 and serves to supply the toner (one-component non-magnetic toner) 107 to the supply roller 105.

Between the supply roller 105 and the toner feed member 106, there is arranged a guide wall 108 which is formed with a flow passage 109 for guiding the removed toner carried by the supply roller 105 to a position where such toner is joined to the toner supplied by the toner feed member 106.

The joined or combined toner is sent by the supply roller 105 again to the sliding contact area S between the developing sleeve 103 and the supply roller, while the amount of the toner is regulated by a regulating member 110 disposed above the supply roller 105.

A seal member 111 is disposed below the developing sleeve 103 to close a clearance between the developing sleeve and the container 102. The seal member 111 is formed of a flexible sheet such as MYLAR (Trade name, sold by Du Pont).

Further, a power source 112 is arranged between the photosensitive drum 101 and the developing sleeve 103, and a power source 113 is arranged between the developing sleeve 103 and the supply roller 105, which power sources serve to apply bias voltages.

Figure 3:
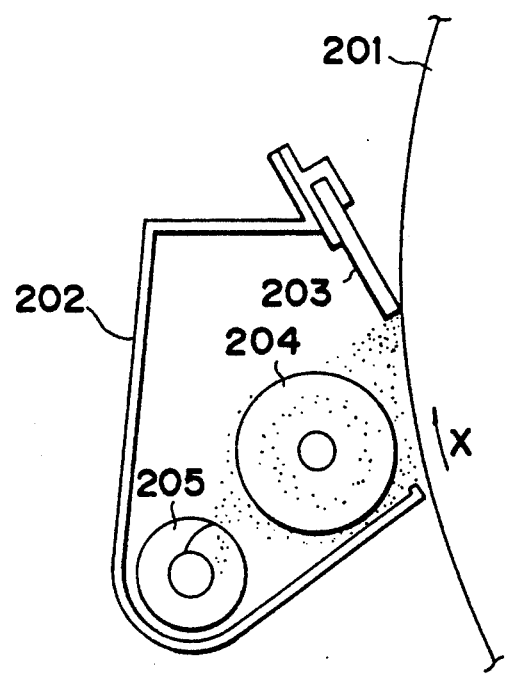
FIG. 3 is a schematic elevational sectional view of a cleaning device wherein an elastic body according to the present invention is used as a cleaning blade.

FIG. 3 is a schematic elevational sectional view of a cleaning device wherein the elastic body according to the present invention is used as a cleaning blade.

In FIG. 3, the reference numeral 201 denotes a photosensitive drum as an electrostatic latent image bearing member rotated in a direction shown by the arrow X. A longitudinal axis of the photosensitive drum 201 extends horizontally, and a cleaning device 202 is arranged near the photosensitive drum.

Within the cleaning device 202, there are disposed a cleaning blade 203 formed by the elastic body of the present invention, a magnet roller 204, and a feed screw 205. The toner, which was not transferred onto a recording sheet at a transfer station (not shown) and is still remaining on the photosensitive drum, is removed from the photosensitive drum by the cleaning blade, and the foreign matters adhered to the drum is removed mainly by the action of the magnet roller 204. Due to the position of the cleaning device, the removed toner remains near the free end of the cleaning blade for a while, and then is fed into a toner reservoir portion by the action of the magnet roller, and, if necessary, is ejected out of the cleaning device by the feed screw 205.

The elastic body of the present invention may be applied to a pair of belt-shaped elastomer members in place of a pair of rollers for fixing a recording sheet in a fixing apparatus.

Figure 4:
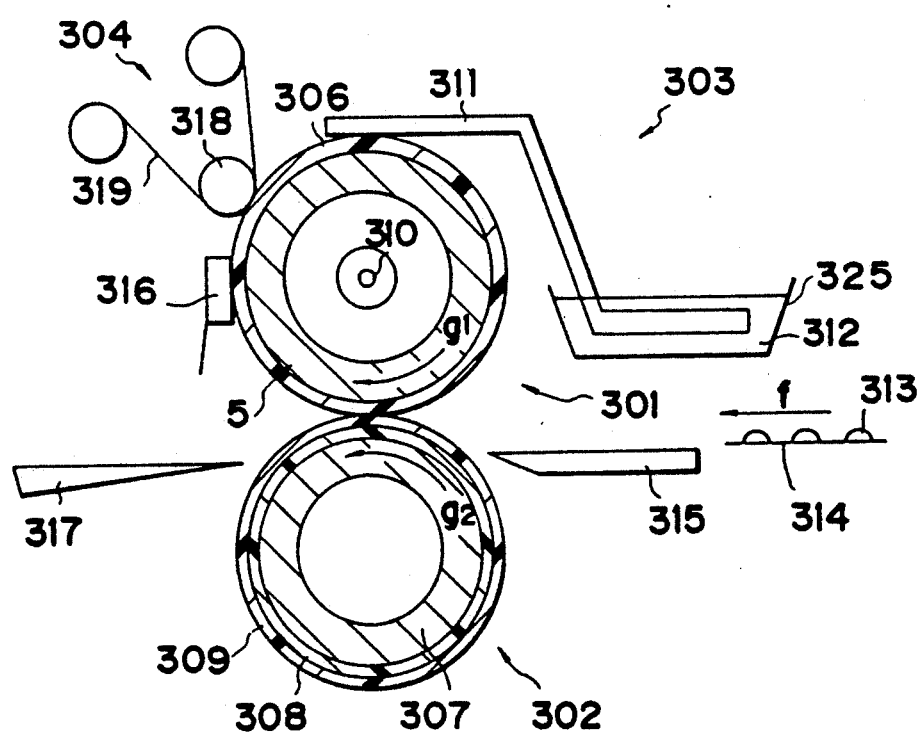
FIG. 4 is a schematic elevational sectional view of a fixing device according to a preferred embodiment of the present invention.

FIG. 4 is an elevational sectional view showing a fixing device according to another embodiment of the present invention. In FIG. 4, the fixing device comprises a fixing roller 301 and a pressure roller 302 urged against the fixing roller. The fixing roller 301 comprises a core member 5 made of aluminium, and an outer elastic layer 306 having a predetermined thickness and made of the elastic body consisting of addition reaction type silicone rubber of the present invention. The pressure roller 302 comprises a core member 307 made of aluminium, an intermediate elastic core layer 308 having a predetermined thickness and made of HTV silicone rubber, and an outer resin coating layer 309.

A halogen heater 310 acting as a heat source is disposed within the fixing roller 301. A thermistor 316 is abutted against the fixing roller 301, which thermistor controls ON/OFF of the halogen heater 310. In this way, the temperature of the fixing roller 301 is maintained to a proper value (for example, 170° C.) suitable to fix the non-fixed toner image 313 to the recording sheet 314. The fixing roller 301 and the pressure roller 302 are rotated in opposite directions shown by the arrows g1, g2 respectively, by a driving mechanism (not shown).

On the other hand, in the proximity of the fixing roller 301, there is disposed a mold-releasing agent applying device 303 to improve the toner separating ability. The mold-releasing agent applying device 303 includes a felt element 311 one end of which is abutted against the surface of the fixing roller 301 and the other end of which is immersed into silicone oil (mold-releasing agent) 312 contained in an oil tank 325, so that the silicone oil 312 is applied to the surface of the fixing roller 301 via the felt element 311.

Further, a cleaning device 304 for cleaning the toner offset onto the fixing roller 301 is disposed in opposition to the mold-releasing applying device 303 with respect to the fixing roller 301. The cleaning device 304 comprises a non-woven cloth sheet 319 for cleaning the surface of the fixing roller 301, and an urging roller 318 for urging the sheet 319 against the surface of the fixing roller 301.

The recording sheet 314 on which the non-fixed toner image 313 is born is fed in a direction shown by the arrow f by a feeding mechanism (not shown), and is passed between the fixing roller 301 and the pressure roller 302 (which are rotated in the directions g1, g2) with the imaged surface contacting with the fixing roller 301, while being guided by an inlet guide 315. Meanwhile, the non-fixed toner image 313 on the recording sheet 314 is being fixed onto the recording sheet 314 by the pressure from the fixing roller 301 and the pressure roller 302 and the heat controlled to the predetermined temperature and supplied from the halogen heater 310 via the fixing roller 301. After the fixing operation, the recording sheet 314 is ejected out of the image forming system through an outlet guide 317.

Figure 5:
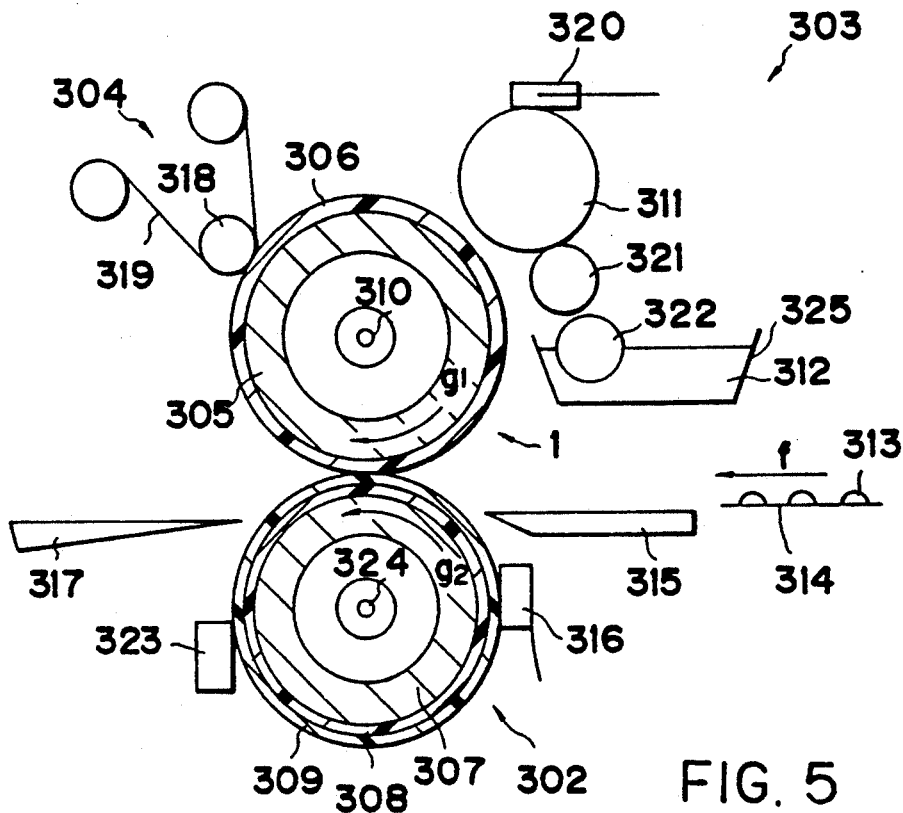
FIG. 5 is a schematic elevational sectional view of a fixing device according to another embodiment of the present invention.

FIG. 5 is an elevational sectional view of a fixing device using the fixing roller of the present invention, according to a further embodiment of the present invention. In this embodiment, a halogen heater 324 is also disposed within the pressure roller 302, and a thermistor 316 abutted against the pressure roller 302 serves to control ON/OFF of the halogen heater 310 of the fixing roller 301 and the halogen heater 324 of the pressure roller 302. In this way, the temperatures of the fixing roller 301 and of the pressure roller 302 are maintained to proper values (for example, 170° C.) suitable to fix the non-fixed toner image 313 to the recording sheet 314.

Accordingly, when the recording sheet 314 on which the non-fixed toner image 313 was born is passed between the fixing roller 301 and the pressure roller 302 with the imaged surface contacting with the fixing roller 301, the non-fixed toner image 313 is fixed onto the recording sheet 314 by the pressure from the fixing roller 301 and the pressure roller 302 and the heat of the predetermined temperature supplied from the halogen heaters 310, 324 via the fixing roller 301 and the pressure roller 302.

Further, in this embodiment, the mold-releasing agent applying device 303 disposed in the proximity of the fixing roller 301 sends the silicone oil 312 in the oil tank 325 to an apply roller 311 via pick-up rollers 322, 321, and the oil 312 is applied from the apply roller 311 to the fixing roller 301 while regulating the applying amount by a blade 320 contacting with the apply roller.

The mold-releasing applying device 303 is arranged so that it can be shifted toward and away from the fixing roller 301 to contact with or be separated from the latter, for example, in such a manner that the silicone oil 312 is applied to the fixing roller 301 from the time when the leading end of the recording sheet 314 reaches 1 cm on this side of the nip between the fixing roller 301 and the pressure roller 302 to the time when the trailing end of the sheet 314 leaves from the nip by 1 cm.

Further, in this embodiment, a simple cleaning blade 323 is disposed in opposition to the thermistor 316 with respect to the pressure roller 302, thereby cleaning the surface of the pressure roller 302.

In this embodiment, the fixing device and the like are substantially the same as those shown in FIG. 2, and therefore, the reference numerals used in FIG. 2 denote the same constructural elements designated by the same reference numerals in FIG. 4.

Figure 6:
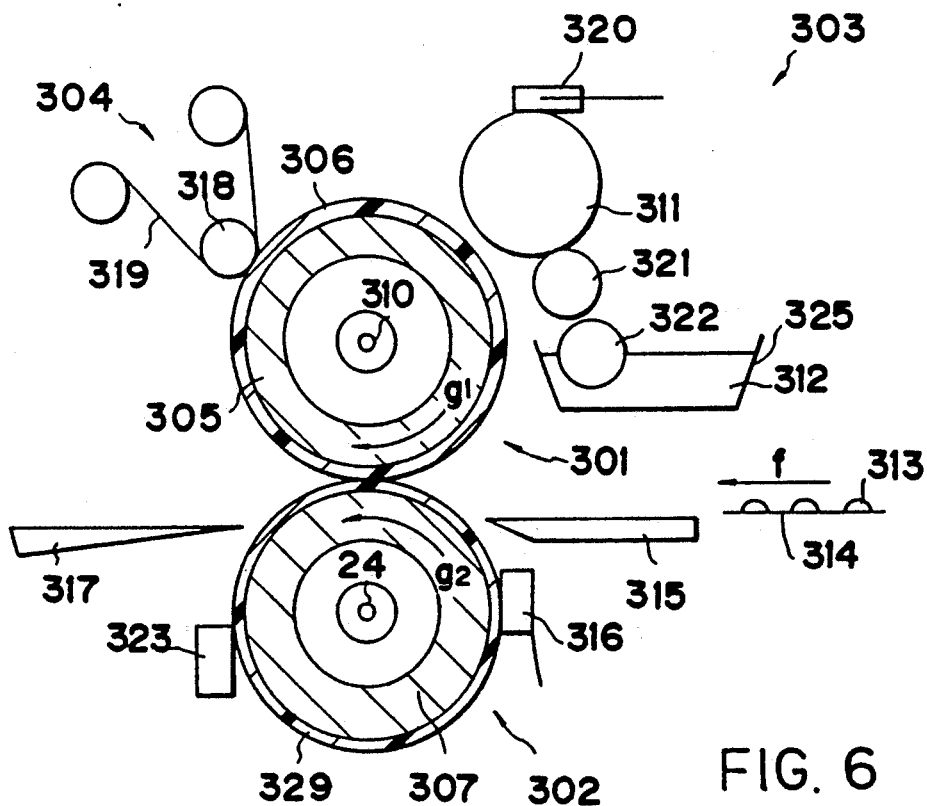
FIG. 6 is a schematic elevational sectional view of a fixing device according to a further embodiment of the present invention.

FIG. 6 is an elevational sectional view of a fixing device using the fixing roller of the present invention, according to a still further embodiment of the present invention. The fixing device in this embodiment is suitable to be used with an image forming system capable of obtaining both-sided copies. In this fixing device, not only the elastic layer 306 of the fixing roller 301 is formed of the special addition reaction type silicone rubber of the present invention, but also an outer elastic layer 329 of the pressure roller 302 is also formed of the same special addition reaction type silicone rubber of the present invention. The other construction of the fixing device shown in FIG. 6 is the same as that shown in FIG. 5, and thus, the same reference numerals designate the same constructural elements.

When the both-sided copy is desired, in the fixing device, the recording sheet 314 on one surface of which the toner image 313 was formed is passed through the nip between the fixing roller 301 and the pressure roller 302 with the image surface contacting with the fixing roller 301, thereby fixing the toner image 313. Thereafter, a toner image similar to the toner image 313 is formed on the other surface of the same recording sheet 314, and the recording sheet 314 is again passed through the nip between the fixing roller 301 and the pressure roller 302 with the formed toner image on the other surface contacting with the fixing roller 301, thereby fixing the formed toner image onto the other surface. In this way, the both-sided copy can be obtained.

The tensile strength of the elastic layer of each of the fixing rollers shown in FIGS. 1–6 is 10 kgf/cm$^2$ and preferably 14 kgf/cm$^2$ and more preferably 20 kgf/cm$^2$.

Since the elastic body of the present invention comprises the special addition silicone elastic material, it has excellent mold-releasing ability and physical strength. Further, the fixing roller having such elastic body as the outer elastic layer, and the fixing device including such fixing roller have good anti-offset ability and can fix the non-fixed toner image on the recording sheet effectively without deteriorating the image.

The present invention will now be more fully explained in connection with embodiments illustrated herein below. However, it should be noted that the present invention is not limited to such embodiments.

EMBODIMENT

Preparation of Polysiloxane Mixture 1

Straight-chain dimethyl polysiloxane (p - 1) terminated with vinyl groups and having the viscosity of 100,000 poise at a temperature of 25° C. (40 weight part), resinous organopolysiloxane (p - 2) having the viscosity of 300 poise at a temperature of 25° C. and being a block polymer which comprises a resin segment comprising 4-functional group and 3-functional group, and an oil segment comprising 2-functional groups in the same molecule (60 weight part), platinum catalyst, and a bridging agent were mixed or compounded, thus obtaining polysiloxane mixture 1. The kind and amount of the platinum catalyst and the bridging agent (hydrogen polysiloxane having more than one silicon-linked hydrogen atoms per one molecule in average) may be selected so that the curing ability of the mixture is optimum.

Preparation of Comparing Polysiloxane Mixtures 1 to 3

In place of (p - 1) (40 weight part) used in preparing the polysiloxane mixture 1, one of three straight-chain dimethyl polysiloxane (p - 1) each terminated with vinyl group and each having the viscosity of 50, 400 and 5000 poise, respectively, at a temperature of 25° C. (40 weight part) were used, and the above (p - 2) (60 weight part) was also used, and these were mixed together with a platinum catalyst and a bridging agent in the same manner as the above, thereby obtaining the comparing polysiloxane mixtures 1 to 3.

EMBODIMENT 1, COMPARISON EXAMPLE 1, COMPARISON EXAMPLE 2, COMPARISON EXAMPLE 3

The polysiloxane mixture 1, comparing polysiloxane mixture 1, comparing polysiloxane mixture 2 and comparing polysiloxane mixture 3 were press-cured under a temperature of 130° C. for 30 minutes, respectively, to obtain four silicone rubber sheets each having a thickness of 2 mm. Then, these sheets were subjected to the secondary vulcanization under a temperature of 200° C. for four hours. Thereafter, the tensile strength of each of the sheets was measured on the basis of the Japanese Industrial Standard K6301 at a room temperature. The results are shown in Table 1 herein below.

Further, fixing rollers were manufactured by using the above-mentioned polysiloxane mixtures, as follows:

Heat-resistive grade HTV silicone rubber was vulcanized and bonded around a hollow core member made of aluminium alloy (for a fixing roller) having an outer diameter of 34 mm and then was polished to obtain a rubber roller having an outer diameter of 39 mm. Then, the surface of the rubber roller was subjected to primer treatment. Thereafter, fluororubber coating material (GL-152, made of Daikin Kogyo Co., Ltd., Japan) was spray-coated on the surface of the roller to have a thickness of 50 μm. Then, the roller was dried under a temperature of 150° C. for 30 minutes, thereby obtaining a fluororubber-coated rubber roller. After the fluororubber coated rubber roller was subjected to the primer treatment with siloxane, it was loaded into a cylindrical mold pre-heated at a temperature of 130° C. Then, one of the polysiloxane mixtures was injected into the mold, and the mold containing rubber roller and polysiloxane mixture therein was left for 30 minutes to cure the mixture. After the curing, the polysiloxane-coated fixing roller had an outer diameter of 40 mm, and a thickness of the silicone rubber elastic layer was 3 mm. Such fixing roller was prepared for each of the above-mentioned polysiloxane mixtures.

Such fixing rollers were subjected to secondary vulcanization under a temperature of 200° C. for four hours. By using each of these fixing rollers in a heat fixing device shown in FIG. 1, the copy life test was effected under the following condition. The results are shown in the Table 1.

The test condition for the copy life using the fixing device of FIG. 1 is as follows:

| Heat control temperature: | 170° C. |
|---|---|
| Urging force of pressure roller: | 40 kgf |
| Sheet to be passed: | Recording sheet having A4 size (84 g/m$^2$) on which a test pattern of non-fixed color (magneta) toner image was formed |
| Sheet passing speed: | 10 sheets/min. |
| Releasing agent: | Dimethyl silicone oil |
| Toner: | Toner comprising polyester group main binder of 100 weight part, pigment (C.I solvent red 49) of 4 weight part, dye (C.I pigment red 122) of 0.7 weight part, charge control agent of 4 weight part, and additive. |

Under the above condition, sheets were passed through the nip between the fixing roller and the pressure roller until the toner offset occurred on the fixing roller, and the numbers of the sheet is defined as the copy life.

TABLE 1

| | Viscosity of straight-chain dimethyl polysiloxane terminated with vinyl group (poise) | Viscosity of polysiloxane mixture (poise) | Tensile strength (kgf/cm$^2$) | Copy life (sheets) |
|---|---|---|---|---|
| Embodiment 1 | 100000 | 10000 | 25 | 100000 |
| Comparison example 1 | 50 | 200 | 60 | 20000 |
| Comparison example 2 | 400 | 350 | 53 | 25000 |
| Comparison example 3 | 5000 | 1000 | 45 | 30000 |

As apparent from the Table 1, the fixing roller having the silicone rubber elastic layer obtained from the polysiloxane mixture of the present invention in the Embodiment 1 had the excellent copy life. The mechanical strength of such silicone rubber elastic layer was durable to the copy life test, and, regarding the heat-resistance, there was no deterioration and/or degeneration of the roller surface.

Preparation of Polysiloxane Mixture 2

In place of (p - 2) (60 weight part) used in preparing the polysiloxane mixture 1, vinyl-containing resinous organopolysiloxane having the viscosity of 40 poise at a temperature of 25° C. which is a block polymer comprising a resin segment comprising 4-functional group and 3-functional group, and an oil segment comprising 2-functional groups in the same molecule (60 weight part) was used. And, the others were the same as the aforementioned one. In this way, a polysiloxane mixture 2 was obtained.

Preparation of Polysiloxane Mixture 3

In place of (p - 1) (40 weight part) and (p - 2) (60 weight part) used in preparing the polysiloxane mixture 1, (p - 1) of 30 weight part, (p - 2) of 40 weight part and 30 weight part of straight-chain dimethyl polysiloxane having the viscosity of 10 poise at a temperature of 25° C., terminated with vinyl groups were used. And, the others were the same as the aforementioned one. In this way, a polysiloxane mixture 3 was obtained.

Preparation of Polysiloxane Mixture 4

In place of (p - 1) (40 weight part) and (p - 2) (60 weight part) used in preparing the polysiloxane mixture 1, (p - 1) of 30 weight part, (p - 2) of 40 weight part and 30 weight part of straight-chain dimethyl polysiloxane having the viscosity of 10 poise at a temperature of 25° C., terminated with vinyl group and having vinyl side chain were used. And, the others were the same as the aforementioned one. In this way, a polysiloxane mixture 4 was obtained.

Preparation of Comparing Polysiloxane Mixture 4

In place of (p - 1) (40 weight part) and (p - 2) (60 weight part) used in preparing the polysiloxane mixture 1, (p - 1) of 100 weight part was used. And, the others were the same as the aforementioned one. In this way, a comparing polysiloxane mixture 4 was obtained.

Preparation of Comparing Polysiloxane Mixture 5

In place of (p - 1) (40 weight part) and (p - 2) (60 weight part) used in preparing the polysiloxane mixture 1, (p - 1) of 60 weight part, and resinificated organosiloxane having the viscosity of 1 poise were used. And, the others were the same as the aforementioned one. In this way, a comparing polysiloxane mixture 5 was obtained.

EMBODIMENT 2, EMBODIMENT 3, EMBODIMENT 4, COMPARISON EXAMPLE 4 AND COMPARISON EXAMPLE 5

The polysiloxane mixture 2, polysiloxane mixture 3, polysiloxane mixture 4, comparing polysiloxane mixture 4 and comparing polysiloxane mixture 5 were used, respectively, to obtain rubber sheets each having a thickness of 2 mm and fixing rollers in the same manner as in the Embodiment 1. Further, the tensile strength of these sheets were measured in the same manner as in the Embodiment 1 and the copy life test was effected by using such fixing rollers in the same manner as in the Embodiment 1. The results are shown in the following Table 2.

TABLE 2

| | Viscosity of polysiloxane mixture (poise) | Tensile strength (kgf/cm$^2$) | Copy life (sheets) | Remarks |
|---|---|---|---|---|
| Embodiment 2 | 4000 | 30 | 70000 | |
| Embodiment 3 | 3000 | 14 | 100000 | surface wear trace after test |
| Embodiment 4 | 3000 | 20 | 95000 | surface wear trace after test |
| Comparison example 4 | 100000 | immeasurable | breakdown | |
| Comparison example 5 | 5000 | 33 | 40000 | |

As apparent from the Table 2, the fixing roller having the silicone rubber elastic layer obtained from the polysiloxane mixture of the present invention had the excellent copy life. the fixing roller shown in Embodiment 2 was inferior to the fixing roller of Embodiment 1 in the copy life, but was excellent in the workability due to the lower viscosity. The mechanical strength of such fixing roller was excellent and was durable to the copy life test, and, regarding the heat-resistance, there was no deterioration and/or degeneration of the roller surface. Since the tensile strengths of the silicone rubber elastic bodies in the Embodiment 3 and Embodiment 4 were slightly weaker than that of the elastic body of Embodiment 1, they were less wear-resistant regarding the copy life. However, there was no problem to put these elastic bodies in practical use.

The silicone rubber elastic body obtained in the Comparison Example 4 had less strength, and, thus, was not durable to the tensile strength test, and, in the manufacture of the fixing roller, it was difficult to inject it into the mold due to the high viscosity and, was difficult to remove it from the mold, due to the lack of the strength causing form break-down, thus causing the manufacturing problems.

Preparation of Polysiloxane Mixture 5

A base oil comprising straight-chain dimethyl polysiloxane having the viscosity of 200000 poise at a temperature of 25° C. terminated with vinyl group (20 weight part), vinyl-containing resinous organopolysiloxane having the viscosity of 40 poise at a temperature of 25° C. which is a block polymer comprising a resin segment comprising 4-functional group and 3-functional group, and an oil segment comprising 2-functional groups in the same molecule (40 weight part) and straight-chain dimethyl polysiloxane having the viscosity of 5 poise at a temperature of 25° C. terminated with vinyl group (40 weight part) was obtained. And, the base oil of 100 weight part, quartz powder of 20 weight part, a platinum catalyst and a bridging agent (hydrogen polysiloxane having more than one silicon-linked hydrogen atoms per one molecule in average) were mixed, thereby obtaining polysiloxane mixture 5.

EMBODIMENT 5

The polysiloxane mixture 5 was press-cured under a temperature of 130° C. for 30 minutes, thereby obtaining a silicone rubber sheet having a thickness of 2 mm. Further, after the obtained silicone rubber sheet was subjected to the secondary vulcanization under a temperature of 200° C. for four hours, it was cut to have a width of 20 mm, thereby obtaining a rubber blade having a hardness of 50° (JIS-A). The obtained rubber blade was used in the developing device of FIG. 2 as the developing blade.

In this Embodiment, the developing sleeve was formed by processing a surface of aluminium sleeve having a diameter of 20 mm with #600 sand paper to provide a rough surface having indentation having a pitch of 1.5 μm.

The non-magnetic toner used in this Embodiment was a powder comprising carbon of 10 weight part and polystyrene of 90 weight part as main components and having an average particle diameter of 7-15 μm, and silica of about 1.0 weight percent (on the basis of the toner weight) was added as an outward additive to afford the fluidity to the toner. As the seal member for preventing the toner from scattering from the container, a thin Myler sheet having a thickness of 50 μm was used. The urging pressure of the developing blade against the developing sleeve is effective to have a value of about 5-100 g/cm in case where the hardness and size of the blade were changed, and preferably with a tolerance of ±5 grams in a longitudinal direction of the developing sleeve. In this Embodiment, such urging pressure was set to about 45 g/cm. As the supply roller, a sponge roller having a diameter of 14 mm and formed by winding Everlight (commercial name, sold by Bridgestone Co., Ltd. ) having a foam diameter of 1 mm around a stainless steel core member having a diameter of 6 mm was used. The developing sleeve was rotated at a speed of 120 mm/sec and the relative rotational speed of the supply roller with respect to the developing sleeve was set to 50-300 mm/sec. The following results were obtained when the relative speed was set to 70 mm/sec. As a result of the test effected in this way, it was possible to form a thin toner layer having a thickness of 30-100 μm on the surface of the developing sleeve without any stripe and unevenness. Further, it was ascertained that the thickness of the toner layer could be altered by changing the line pressure of the developing sleeve.

In this test, the thickness of the toner layer on the developing sleeve was smaller than a distance between the developing sleeve and the photosensitive drum, and the developing method (so-called non-contact development method or jumping development method) wherein the toner is moved from the developing sleeve to the photosensitive drum through such distance was used.

In this test, an electrostatic latent image having dark area potential of +600 V and light area potential of 0 V was formed on the photosensitive drum, the distance between the photosensitive drum and the developing sleeve was set to about 300 μm, the thickness of the toner layer was regulated to have a value of 50 μm, and the developing bias obtained by superimposing DC voltage of +150 V on alternate voltage having rectangular waves having peak-to-peak voltage of 1400 V and frequency of 1800 Hz was applied to the developing sleeve. In this way, the developing was effected at a process speed of 100 mm/sec.

Even after the developing was effected by 50000 times, the density unevenness did not occur on the developed image due to the adhesion or fusion of the toner to the developing blade, thus obtaining the good image.

Preparation of Polysiloxane Mixture 6

Base oil comprising straight-chain dimethyl polysiloxane having the viscosity of 200000 poise at a temperature of 25° C. terminated with vinyl groups (20 weight part), resinous organopolysiloxane having the viscosity of 40 poise at a temperature of 25° C. which is a block polymer (with vinyl groups) comprising a resin segment comprising 4-functional group and 3-functional group, and an oil segment comprising 2-functional groups in the same molecule (30 weight part) and straight-chain dimethyl polysiloxane having the viscosity of 5 poise at a temperature of 25° C. terminated with vinyl group (50 weight part) was obtained. And, the base oil of 100 weight part, quartz powder of 20 weight part, reinforcing silicate fine powder (silicic anhydride subjected to surface methylation treatment to have specific surface area of 110 m$^2$/g and average particle diameter of about 16 μm) of 5 weight part, a platinum catalyst and a bridging agent (hydrogen polysiloxane having more than one silicon-linked hydrogen atoms per one molecule in average) were mixed, thereby obtaining polysiloxane mixture 6.

EMBODIMENT 6

The polysiloxane mixture 6 was press-cured under a temperature of 130° C. for 30 minutes, thereby obtaining a silicone rubber sheet having a thickness of 3 mm. Further, after the obtained silicone rubber sheet was subjected to the secondary vulcanization under a temperature of 200° C. for four hours, it was cut to have a width of 15 mm, thereby obtaining a rubber blade having a hardness of 55° (JIS-A). The obtained rubber blade was used in the cleaning device of FIG. 3 as the cleaning blade.

The durability of the cleaning blade was tested by using the actual image forming system under the following condition:

| | |
|---|---|
| Abutment angle between blade and drum: | 25° |
| Line pressure: | 20 g/cm |
| Free length: | 5 mm |
| Toner: | one-component polystyrene toner |

| | |
|---|---|
| | -continued |
| | having average diameter of 12 μm |
| Process speed: | 20 mm/sec. |

After the durability test for 50000 sheets, it was found that there were no poor cleaning due to the adhesion of toner to the blade, and the bending-back of the blade due to the increase in friction force.

EMBODIMENT 7, EMBODIMENT 8 AND EMBODIMENT 9

After a hollow core member (for fixing roller) made of aluminium alloy and having an outer diameter of 58 mm was subjected to the siloxane primer treatment, it was loaded into a cylindrical mold pre-heated at a temperature of 130° C. Then, one of the polysiloxane mixtures 1, 2, 3 was injected into the mold, and the mold with rubber roller and polysiloxane mixture therein was left for 30 minutes to cure the mixture. After the curing, the polysiloxane-coated fixing roller had an outer diameter of 60 mm, and a thickness of the silicone rubber elastic layer was 1 mm. Such fixing roller was prepared for each of the above-mentioned polysiloxane mixtures.

Such fixing rollers were subjected to secondary vulcanization under a temperature of 200° C. for four hours. By using each of these fixing rollers in a heat fixing device shown in FIG. 4, the durability test (the copy life test) was effected under the following condition.

The test condition for the copy life using the fixing device of FIG. 4 is as follows:

| | |
|---|---|
| Heater control temperature: | 180° C. |
| Urging force of pressure roller: | 60 kgf |
| Sheet to be passed: | Recording sheet having A4 size (64 g/m$^2$) on which a test pattern of non-fixed color (magenta) toner image was formed |
| Releasing agent: | Phenyl silicone oil having the viscosity of 450 cs at a temperature of 25° C. and including phenyl group having mol number of 25 (mol) |
| Sheet passing speed: | 40 sheets/min. |
| Toner: | Black toner comprising polyester group main binder of 100 weight part, magnetic body of 60 weight part, charge control agent of 2 weight part, fixing aiding agent of 3 weight part and an outward additive. |

It was found that the offset phenomenon did not occur on the fixed image and the excellent fixing ability could be obtained until 1,000,000 sheets were fixed by the fixing device wherein the addition silicone rubber in the Embodiment 7 was used as the elastic layer of the fixing roller, 950.000 sheets were fixed by the fixing device wherein the addition reaction type silicon rubber in the Embodiment 8 was used as the elastic layer of the fixing roller, and 970,000 sheets were fixed by the fixing device wherein the addition reaction type silicone rubber in the Embodiment 9 was used as the elastic layer of the fixing roller, respectively.

Further, for all of the fixing rollers used in the Embodiment 7, Embodiment 8 and Embodiment 9 no swelling of the elastic layer thereof due to the silicone oil was observed during the durability test, and provided the good fixed image.

EMBODIMENT 10

In place of the phenyl silicone oil used in the Embodiment 7, phenyl methyl silicone oil having the viscosity of 450 cs at a temperature of 25° C. and including phenyl group having mol number of 10 (mol) was used. The others were the same as the Embodiment 7. In this condition, the same durability test of the fixing roller as the Embodiment 7 was effected.

As a result, similar to the Embodiment 7, it was found that the offset phenomenon did not occur on the fixed image and the excellent fixing ability could be obtained until 1,000,000 sheets were fixed by the fixing device. Further, the fixing roller used in this Embodiment always had no swelling of the elastic layer thereof due to the silicone oil during the durability test, and provided the good fixed image.

EMBODIMENT 11

In place of the phenyl silicone oil used in the Embodiment 7, phenyl methyl silicone oil having the viscosity of 300 cs at a temperature of 25° C. and including phenyl group having mol number of 25 (mol) was used. The others were the same as the Embodiment 7. In this condition, the same durability test of the fixing roller as the Embodiment 7 was effected.

As a result, similar to the Embodiment 7, it was found that the offset phenomenon did not occur on the fixed image and the excellent fixing ability could be obtained until 1,000,000 sheets were fixed by the fixing device. Further, the fixing roller used in this Embodiment always had no swelling of the elastic layer thereof due to the silicone oil during the durability test, and provided the good fixed image.

REFERENCE EXAMPLE

In place of the phenyl silicone oil used as the releasing agent in the Embodiment 7, dimethyl silicone oil was used. The others were the same as the Embodiment 7. In this condition, the same durability test of the fixing roller as the Embodiment 7 was effected. As a result, it was found that the outer diameter of the fixing roller was changed due to the swelling and the elastic layer was separated from the core member.

COMPARISON EXAMPLE 6

In place of the polysiloxane mixture used in the Embodiment 7, comparing polysiloxane mixture 1 was used. The others were the same as the Embodiment 7. In this way, a fixing roller having a silicone rubber elastic layer on a core member was obtained.

The obtained fixing roller was used in the heat fixing device of FIG. 4, and the same durability test as the Embodiment 7 was effected. As a result, it was found that the offset phenomenon occurred on the fixed image when 200,000 sheets were fixed. It is apparent that the durability in this Example is inferior to that of the Embodiment 7.

EMBODIMENT 12, EMBODIMENT 13 AND EMBODIMENT 14

The fixing rollers shown in the Embodiment 7, Embodiment 8 and Embodiment 9 were used in the fixing device of FIG. 5, and the durability test was effected under the following condition.

| | |
|---|---|
| Heater control temperature: | 150° C. (fixing roller), 150° C. (pressure roller) |
| Urging force of pressure roller: | 50 kgf |
| Sheet to be passed: | Recording sheet having A4 size (80 g/m$^2$) on which a test pattern of non-fixed part, a charge control agent of 4 weight part and an outward additive. |

It was found that the offset phenomenon did not occur on the fixed image until 80,000 sheets were fixed by the fixing device wherein the elastic body formed from the polysiloxane mixture 1 was used as the elastic layer of the fixing roller (Embodiment 12). Similarly, it was found that, when the elastic body formed from the polysiloxane mixture 2 was used as the elastic layer of the fixing roller (Embodiment 13) and when the elastic body formed from the polysiloxane mixture 3 was used as the elastic layer of the fixing roller (Embodiment 14), the offset phenomenon did not occur on the fixed image until 80,000 sheets were fixed by the respective fixing devices. In any case, the fixing roller had the excellent fixing ability, and the heat-resistance and wear-resistance of the elastic body were no problem, and the service life of the fixing roller was greatly extended.

Further, the fixing rollers used in the Embodiment 12, Embodiment 13 and Embodiment 14 always had no swelling of the elastic layer thereof due to the silicone oil during the durability test, and provided the good fixed image.

COMPARISON EXAMPLE 7

In place of the polysiloxane mixture 1 used in the Embodiment 10, comparing polysiloxane mixture 1 was used. The others were the same as the Embodiment 10. In this way, a fixing roller having a silicone rubber elastic layer on a core member was obtained.

The obtained fixing roller was used in the heat fixing device of FIG. 5, and the same durability test as the Embodiment 12 was effected.

As a result, it was found that the offset phenomenon occurred on the fixed image when 30,000 sheets were fixed. It is apparent that the durability in this Example is inferior to that of the Embodiment 12.

EMBODIMENT 15, EMBODIMENT 16 AND EMBODIMENT 17

The fixing rollers shown in the Embodiment 7, Embodiment 8 and Embodiment 9 were used in the fixing device of FIG. 6, and the corresponding pressure rollers having elastic layers formed from the polysiloxane mixtures 1, 2, 3 were also used in the fixing device of FIG. 6. And, the durability test was effected by forming the full-color toner image on the recording sheet and fixing the toner image on the both surfaces of the recording sheet under the same condition as that of the Embodiment 12, Embodiment 13 and Embodiment 14 using the fixing device of FIG. 5. In this test, if the offset phenomenon occurred on the fixing roller, it was changed to a new fixing roller to continue the test.

As a result, in the fixing device wherein the elastic bodies formed from the polysiloxane mixture 1 were used as the elastic layers of the fixing roller and the pressure roller in the Embodiment 15, it was found that the deterioration of the image due to the toner pollution of the pressure roller did not occur 500,000 sheets were fixed on both surfaces. Similarly, in the fixing device wherein the elastic bodies formed from the polysiloxane mixture 2 were used as the elastic layers of the fixing roller and the pressure roller (Embodiment 16) and in the fixing device wherein the elastic bodies formed from the polysiloxane mixture 3 were used as the elastic layers of the fixing roller and the pressure roller (Embodiment 17), it was also found that the deterioration of the image due to the toner pollution of the pressure roller did not occur 500,000 sheets were fixed.

COMPARISON EXAMPLE 8

The fixing roller used in the Comparison Example 7 was used in the fixing device of FIG. 6, and a pressure roller having an elastic layer formed from the elastic body comprising the comparison polysiloxane mixture 6 was also used in the fixing device of FIG. 6. And, the durability test similar to that in the Embodiment 15 was effected.

As a result, it was found that the deterioration of the image due to the toner pollution of the pressure roller occurred when 100,000 sheets were fixed. It is apparent that the durability in this Comparative Example is inferior to that of the Embodiment 15.

We claim:

1. A elastic body comprising:
   an addition reaction type silicone rubber elastic material obtained by curing a polysiloxane mixture;
   said polysiloxane mixture comprising at least
   (a) a straight-chain dimethyl polysiloxane having a viscosity of 80,000 poise or more at a temperature of 25° C. and terminated with a vinyl group; and
   (b) a resinous organopolysiloxane having at least two vinyl groups and having a viscosity of 10 poise at a temperature of 25° C. and comprising a block copolymer having a resin segment comprising at least one of a 4-functional constitutional unit and a 3-functional constitutional unit, and a straight-chain oil segment comprising 100 or more continuous 2-functional constitutional units in the same molecule.

2. The elastic body according to claim 1, wherein said resinous organopolysiloxane contains a ladder polymer.

3. The elastic body according to claim 1, wherein said resinous organopolysiloxane is a block polymer comprising a resin segment comprising at least one of a 4-functional constitutional unit and a 3-functional constitutional unit, and a straight-chain oil segment comprising 200 or more continuous 2-functional groups in the same molecule.

4. The elastic body according to claim 1, wherein said polysiloxane mixture comprises at least one of a straight-chain dimethyl polysiloxane having a viscosity of 100 poise or less terminated with vinyl groups and a dimethyl polysiloxane having the viscosity of 100 poise or less and having side chain vinyl group.

5. The elastic body according to claim 1, wherein said straight-chain dimethyl polysiloxane (a) is contained in said polysiloxane mixture by an amount of 10% by weight or more and less than 50% by weight on the basis of the weight of said polysiloxane mixture, and said resinous organopolysiloxane (b) is contained in said polysiloxane mixture by an amount of from more than 50 to 90% by weight on the basis of said polysiloxane mixture, and said straight-chain dimethyl polysiloxane (a) and said resinous organopolysiloxane (b) meet the following relation on the weight base:

(a):(b) =100: more than 100 to 900.

6. The elastic body according to claim 1, wherein said straight-chain dimethyl polysiloxane (a) is contained in said polysiloxane mixture by an amount of 20–49% by weight on the basis of said polysiloxane mixture, and said resinous organopolysiloxane (b) is contained in said polysiloxane mixture by an amount of 51–70% by weight on the basis of said polysiloxane mixture, and said straight-chain dimethyl polysiloxane (a) and said resinous organopolysiloxane (b) meet the following relation on the weight base:

(a): (b) =100: more than 100 to 350.

7. The elastic body according to claim 1, wherein said polysiloxane mixture contains a hydrogen polysiloxane (c) having more than one silicon-linked hydrogen atoms per molecule in average.

8. The elastic body according to claim 7, wherein said hydrogen polysiloxane is prepared so that mol ratio of the silicon-linked hydrogen to vinyl groups in said polysiloxane mixture becomes 0.6–2.5.

9. The elastic body according to claim 7, wherein said hydrogen polysiloxane is prepared so that mol ratio of the silicon-linked hydrogen to vinyl groups in said polysiloxane mixture becomes 0.6–2.0.

10. The elastic body according to claim 1, wherein said polysiloxane mixture has the viscosity of 500–20000 poise.

11. The elastic body according to claim 1, wherein said polysiloxane mixture has the viscosity of 1000–10000 poise.

12. The elastic body according to claim 1, wherein said elastic body is used as an elastic layer formed on a core member of a fixing device for fixing an unfixed toner image carried by a recording sheet onto said recording sheet.

13. The elastic body according to claim 1, wherein said elastic body constitutes a belt-shaped fixing member for fixing an unfixed toner image carried by a recording sheet onto said recording sheet.

14. The elastic body according to claim 1, wherein said elastic body constitutes a developing blade for urging and regulating a toner layer held on a developing sleeve and for forming the toner layer having a predetermined thickness on said developing sleeve.

15. The elastic body according to claim 1, wherein said elastic body constitutes a cleaning blade contacting with an electrostatic latent image bearing member for removing the toner adhered on said electrostatic latent image bearing member, 16. The elastic roller for fixing an unfixed toner image carried by a recording sheet onto said recording sheet, comprising:
   a core member, and an elastic layer formed on a surface of said core member, said elastic layer being formed from an addition reaction type silicone rubber elastic material obtained by curing a polysiloxane mixture;
   said polysiloxane mixture including at least
   (a) a straight-chain dimethyl polysiloxane having a viscosity of 80,000 poise or more at a temperature of 25° C. and terminated with vinyl groups; and
   (b) a resinous organopolysiloxane having at least two vinyl groups and having a viscosity of 10–1000 poise at a temperature of 25° C. and comprising a block copolymer having a resin segment comprising at least one of a 4-functional constitutional unit and a 3-functional constitutional unit, and a straight-chain oil segment comprising 100 or more continuous 2-functional units in the same molecule.

17. The elastic roller according to claim 16, wherein said resinous organopolysiloxane contains a ladder polymer.

18. The elastic roller according to claim 16, wherein said resinous organopolysiloxane is a block polymer comprising a resin segment comprising at least one of a 4-functional constitutional unit and a 3-functional constitutional unit, and a straight-chain oil segment comprising 100 or more continuous 2-functional groups in the same molecule.

19. The elastic roller according to claim 16, wherein said polysiloxane mixture includes at least one of a straight-chain dimethyl polysiloxane having the viscosity of 100 poise or less terminated with vinyl groups and a dimethyl polysiloxane having a viscosity of 100 poise or less and having side chain vinyl group.

20. The elastic roller according to claim 16, wherein said straight-chain dimethyl polysiloxane (a) is contained in said polysiloxane mixture by an amount of 10% by weight or more and less than 50% by weight on the basis of the weight of said polysiloxane mixture, and said resinous organopolysiloxane (b) is contained in said polysiloxane mixture by an amount of from more than 50 to 90% by weight on the basis of the weight of said polysiloxane mixture, and said straight-chain dimethyl polysiloxane (a) and said resinous organopolysiloxane (b) meet the following relation on the weight base:

(a): (b) = 100: more than 100 to 900.

21. The elastic roller according to claim 16, wherein said straight-chain dimethyl polysiloxane ( a ) is contained in said polysiloxane mixture by an amount of 20–49% by weight on the basis of the weight of said polysiloxane mixture, and said resinous organopolysiloxane (b) is contained in said polysiloxane mixture by an amount of 51–70% by weight on the basis of the weight of said polysiloxane mixture, and said straight-chain dimethyl polysiloxane ( a ) and said resinous organopolysiloxane (b) meet the following relation on the weight base:

(a): (b) = 100: more than 100 to 350.

22. The elastic roller according to claim 16, wherein said polysiloxane mixture contains a hydrogen polysiloxane (c) having more than one silicon-linked hydrogen atoms per molecule in average.

23. The elastic roller according to claim 22, wherein said hydrogen polysiloxane is prepared so that mol ratio of the Silicon-linked hydrogen to vinyl groups in said polysiloxane mixture becomes 0.6–2.5.

24. The elastic roller according to claim 22, wherein said hydrogen polysiloxane is prepared so that mol ratio of the silicon-linked hydrogen to vinyl groups in said polysiloxane mixture becomes 0.6–2.0.

25. The elastic roller according to claim 17, wherein said polysiloxane mixture has a viscosity of 500–20000 poise.

26. The elastic roller according to claim 16, wherein said polysiloxane mixture has a viscosity of 1000–10000 poise.

27. The elastic roller according to claim 16, wherein said elastic roller has an elastic body having a tensile strength of 10 kgf/cm$^2$ or more.

28. The elastic roller according to claim 16, wherein said elastic roller comprises a core member, an elastic core layer formed on a surface of said core member, an oil barrier layer formed on a surface of said elastic core layer, and an elastic layer formed on a surface of said oil barrier layer.

29. The elastic roller according to claim 28, wherein said elastic core layer is made of HTV silicone rubber, and said oil barrier layer is made of fluororesin.

30. The elastic roller according to claim 28, wherein said elastic roller fixes an unfixed toner carried on a recording sheet in a condition that mold-releasing agent is applied on a surface of said roller.

31. The elastic roller according to claim 30, wherein said mold-releasing agent contains dimethyl silicone oil or fluorosilicone oil.

32. The elastic roller according to claim 16, wherein said elastic roller comprises a core member, and an elastic layer formed on a surface of said core member.

33. The elastic roller according to claim 32, wherein said elastic roller fixes an unfixed toner carried on a recording sheet in a condition that releasing agent is applied on a surface of said roller.

34. The elastic roller according to claim 33, wherein said releasing agent contains phenyl group silicone oil.

35. The elastic roller according to claim 16, wherein said toner image is a monochrome toner image formed by a magnetic toner containing magnetic bodies.

36. The elastic roller according to claim 16, wherein said toner image is a color toner image formed by a color toner including coloring agent.

37. The elastic roller according to claim 16, wherein said toner image is a full-color toner image formed by a magenta toner, a cyan toner, a yellow toner and a black toner.

38. The elastic roller according to claim 16, wherein said elastic roller has a heating means therein, and the unfixed toner image on said recording sheet is fixed onto said recording sheet by heating and pressing said toner image.

39. A fixing device for fixing an unfixed toner image carried on a recording sheet onto said recording sheet by heating and pressing said toner image, comprising:
a fixing means adapted to pinch, heat and press the recording sheet on which the unfixed toner image is carried comprising a pair of rotatable rollers which are urged against each other and at least one of which has a heating means therein,
one of said rotatable rollers which contacts with the unfixed toner image being a fixing roller comprising a core member, and an elastic layer formed on a surface of said core member and made of an addition reaction type silicone rubber elastic material obtained by curing polysiloxane mixture;
said polysiloxane mixture including at least
(a) a straight-chain dimethyl polysiloxane having a viscosity of 80.000 poise or more at a temperature of 25° C. and terminated with vinyl groups; and
(b) a resinous organopolysiloxane having at least two vinyl groups and having a viscosity of 10–1,000 poise at the temperature of 25° C. and comprising a resin segment comprising a block polymer having at least one of a 4-functional constitutional unit and a 3-functional constitutional unit, and a straight-chain oil segment comprising 100 or more continuous 2-functional constitutional units in the same molecule.

40. The fixing device according to claim 39, wherein said resinous organopolysiloxane contains a ladder polymer.

41. The fixing device according to claim 39, wherein said resinous organopolysiloxane is a block polymer comprising a resin segment comprising at least one of a 4-functional constitutional unit and a 3-functional constitutional unit, and a straight-chain oil segment comprising 100 or more continuous 2-functional groups in the same molecule.

42. The fixing device according to claim 39, wherein said polysiloxane mixture includes at least one of a straight-chain dimethyl polysiloxane having the viscosity of 100 poise or less terminated with vinyl groups and a dimethyl polysiloxane having a viscosity of 100 poise or less and having side chain vinyl group.

43. The fixing device according to claim 39, wherein said straight-chain dimethyl polysiloxane (a) is contained in said polysiloxane mixture by an amount of 10% by weight or more and less than 50% by weight on the basis of the weight of said polysiloxane mixture, and said resinous organopolysiloxane (b) is contained in said polysiloxane mixture by an amount of from more than 50 to 90% by weight on the basis of the weight of said polysiloxane mixture, and said straight-chain dimethyl polysiloxane ( a ) and said resinous organopolysiloxane (b) meet the following relation on the weight base:

(a): (b) =100: more than 100 to 900.

44. The fixing device according to claim 39, wherein said straight-chain dimethyl polysiloxane (a) is contained in said polysiloxane mixture by an amount of 20–49% by weight on the basis of the weight of said polysiloxane mixture, and said resinous organopolysiloxane (b) is contained in said polysiloxane mixture by an amount of 51–70% by weight on the basis of the weight of said polysiloxane mixture, and said straight-chain dimethyl polysiloxane (a) and said resinous organopolysiloxane (b) meet the following relation on the weight base:

(a): (b) =100: more than 100 to 350.

45. The fixing device according to claim 39, wherein said polysiloxane mixture contains a hydrogen polysiloxane (c) having one or more silicon-linked hydrogen atoms per molecule in average.

46. The fixing device according to claim 45, wherein said hydrogen polysiloxane is prepared so that mol ratio of the silicon-linked hydrogen to vinyl groups in said polysiloxane mixture becomes 0.6–2.5.

47. The fixing device according to claim 46, wherein said hydrogen polysiloxane is prepared so that mol ratio of the silicon-linked hydrogen to vinyl groups in said polysiloxane mixture becomes 0.6–2.0.

48. The fixing device according to claim 39, wherein said polysiloxane mixture has a viscosity of 500–20000 poise.

49. The fixing device according to claim 39, wherein said polysiloxane mixture has a viscosity of 100–10000 poise.

50. The fixing device according to claim 39, wherein said fixing device has an elastic body having a tensile strength of 10 kgf/cm$^2$ or more.

51. The fixing device according to claim 39, wherein at least one of said rollers comprises a core member, an elastic core layer formed on a surface of said core member, an oil barrier layer formed on a surface of said elastic core layer, and an elastic layer formed on a surface of said oil barrier layer.

52. The fixing device according to claim 51, wherein said elastic core roller is made of HTV silicone rubber, and said oil barrier layer is made of fluororesin.

53. The fixing device according to claim 51, wherein said fixing roller fixes an unfixed toner image carried on a recording sheet in a condition that a releasing agent is applied on a surface of said roller.

54. The fixing device according to claim 53, wherein said mold-releasing agent contains dimethyl silicone oil or fluorosilicone oil.

55. The fixing device according to claim 39, wherein at least one of said rollers comprises a core member, and an elastic layer formed on a surface of said core member.

56. The fixing device according to claim 55, wherein said fixing roller fixes an unfixed toner image carried on a recording sheet in a condition that releasing agent is applied on a surface of said roller.

57. The fixing device according to claim 56, wherein said releasing agent contains phenyl group silicone oil.

58. The fixing device according to claim 39, wherein said toner image is a monochrome toner image formed by a magnetic toner containing magnetic bodies.

59. The fixing device according to claim 39, wherein said toner image is a color toner image formed by a color toner including coloring agent.

60. The fixing device according to claim 39, wherein said toner image is a full-color toner image formed by a magenta toner, a cyan toner, a yellow toner and a black toner.

61. The fixing device according to claim 39, wherein said fixing means comprises a fixing roller having a heating means therein, and a pressure roller not having a heating means therein.

62. The fixing device according to claim 39, wherein said fixing means comprises a fixing roller having a heating means therein, and a pressure roller having a heating means therein.

63. The fixing device according to claim 39, wherein said fixing means comprises a fixing roller contacting with the unfixed toner image, said fixing roller comprising a core member and an elastic layer (A) formed on a surface of said core member, and a pressure roller not contacting with the unfixed toner image, said pressure roller comprising a core member and an elastic layer (B) formed on a surface of said core member, and each of said elastic layer (A) and elastic layer (B) is made of an addition reaction type silicone rubber elastic material obtained by curing a polysiloxane mixture, said polysiloxane mixture including at least (a) a straight-chain dimethyl polysiloxane having a viscosity of 80000 poise or more at a temperature of 25° C. terminated with vinyl groups; and (b) a resinous organopolysiloxane having at least two vinyl groups and having a viscosity of 10–1,000 poise at the temperature of 25° C. and comprising a resin segment comprising at least one of a 4-functional constitutional unit and a 3-functional constitutional unit, and an oil segment comprising a 2-functional group.

64. The fixing device according to claim 39, wherein said fixing means comprises a fixing roller having a heating means therein and contacting with the unfixed toner image, said fixing roller comprising a core member and an elastic layer (A) formed on a surface of said core member, and a pressure roller having a heater means therein and not contacting with the unfixed toner image, said pressure roller comprising a core member and an elastic layer (B) formed on a surface of said core member, and each of said elastic layer (A) and elastic layer (B) is made of an addition reaction type silicone rubber elastic material obtained by curing a polysiloxane mixture, said polysiloxane mixture including at least
  (a) a straight-chain dimethyl polysiloxane having a viscosity of 80000 poise or more at a temperature of 25° C. and terminated with vinyl groups; and
  (b) a resinous organopolysiloxane having at least two vinyl groups and having a viscosity of 10–1,000 poise at the temperature of 25° C. and comprising a resin segment comprising at least one of a 4-functional constitutional unit and a 3-functional constitutional unit, and an oil segment comprising a 2-functional group; and wherein said fixing roller fixes the unfixed toner image carried on the recording sheet in a condition that phenyl group silicone oil is applied to a surface of said roller.

65. The fixing device according to claim 64, wherein said fixing means fixes an unfixed toner image carried on a front surface of the recording sheet on a back surface of which a fixed toner image is carried, onto said front surface.

66. The fixing device according to claim 39, wherein said fixing means fixes an unfixed toner image carried on a front surface of the recording sheet on a back surface of which toner image is carried, onto said front surface.

* * * * *

UNITED STATES PATENT AND TRADEMARK OFFICE
CERTIFICATE OF CORRECTION

PATENT NO. : 5,327,202
DATED : July 5, 1994
INVENTOR(S) : YASUO NAMI, ET AL.

Page 1 of 3

It is certified that error appears in the above-identified patent and that said Letters Patent is hereby corrected as shown below:

<u>ON TITLE PAGE</u> : Abstract line 5,     "8000 poise" should read --80000 poise--.

<u>COLUMN 2</u>

Line 22, "get" should read --gets--.

<u>COLUMN 3</u>

Line 8, "to" should read --of--.

<u>COLUMN 15</u>

Line 47, "the" should read --The--.

<u>COLUMN 20</u>

Line 6, "non-fixed part," should read
      --non-fixed color (magenta, cyan, yellow, black)
      toner image was formed
  Mold-releasing agent:
      Phenyl silicone oil having the viscosity of 450
      cs at a temperature of 25°C and including phenyl
      group having mol number of 25 (mol)
  Sheet passing speed:   5 sheets/min.
  Toner: Magenta color toner, cyan color toner, yellow color
      toner and black color toner. Magenta toner
      comprises polyester group main binder of 100 weight
      part, pigment (C.I. solvent red 49) of 4 weight
      part, dye (C.I. pigment red 122) of 0.7 weight
      part, a charge control agent of 4 weight part and
      an outward additive. Cyan toner comprises

UNITED STATES PATENT AND TRADEMARK OFFICE
CERTIFICATE OF CORRECTION

PATENT NO. : 5,327,202
DATED : July 5, 1994
INVENTOR(S) : YASUO NAMI, ET AL.

It is certified that error appears in the above-identified patent and that said Letters Patent is hereby corrected as shown below:

COLUMN 20

Line 6 (con't),
polyester group main binder of 100 weight part, phthalocyanine pigment of 5 weight part, a charge control agent of 4 weight part and an outward additive. Yellow toner comprises polyester group main binder of 100 weight part, C.I. pigment yellow 17 of 5 weight part, a charge control agent of 4 weight part and an outward additive. Black toner comprises polyester group main binder of 100 weight part, carbon black of 5 weight part,--.

COLUMN 21

Line 26, "A" should read --An--.
Line 31, "80,000 poise" should read --80000 poise--.

COLUMN 22

Line 15, "atoms" should read --atom--.
Line 49, "member," should read --member.--.
Line 60, "80,000 poise" should read --80000 poise--.

COLUMN 23

Line 47, "atoms" should read --atom--.
Line 50, "Silicon-linked" should read --silicon-linked--.
Line 56, "claim 17," should read --claim 16,--.

COLUMN 24

Line 53, "80.000 poise" should read --80000 poise--.
Line 59, "10-1,000 poise" should read --10-1000 poise--.

UNITED STATES PATENT AND TRADEMARK OFFICE
CERTIFICATE OF CORRECTION

PATENT NO. : 5,327,202
DATED : July 5, 1994
INVENTOR(S) : YASUO NAMI, ET AL.

It is certified that error appears in the above-identified patent and that said Letters Patent is hereby corrected as shown below:

COLUMN 25

Line 54, "100-10000" should read --1000-10000--.

COLUMN 26

Line 52, "10-1,000" should read --10-1000--.

COLUMN 27

Line 7, "10-1,000" should read --10-1000--.

COLUMN 28

Line 13, "toner" should read --the fixed toner--.

Signed and Sealed this

Sixth Day of June, 1995

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,327,202
DATED : July 5, 1994
INVENTOR(S) : Yasuo Nami, et al

It is certified that error appears in the above-indentified patent and that said Letters Patent is hereby corrected as shown below:

<u>COLUMN 21</u>

Line 35, "10" should read --10-1000--.

Signed and Sealed this

Twenty-eighth Day of November 1995

Attest:

BRUCE LEHMAN

Attesting Officer     Commissioner of Patents and Trademarks